US009194401B2

(12) United States Patent
O'Brien, II et al.

(10) Patent No.: US 9,194,401 B2
(45) Date of Patent: Nov. 24, 2015

(54) ULTRA LIGHTWEIGHT AND COMPACT ACCUMULATOR

(75) Inventors: James A. O'Brien, II, LaSalle, MI (US); Matthew W. Witte, Tecumseh, MI (US); George J. Frank, Deerfield, MI (US)

(73) Assignee: NRG Enterprises, Inc., Deerfield, MI (US)

( * ) Notice: Subject to any disclaimer, the term of this patent is extended or adjusted under 35 U.S.C. 154(b) by 156 days.

(21) Appl. No.: 13/221,364

(22) Filed: Aug. 30, 2011

(65) Prior Publication Data

US 2012/0067446 A1 Mar. 22, 2012

Related U.S. Application Data

(60) Provisional application No. 61/385,328, filed on Sep. 22, 2010.

(51) Int. Cl.
*F16L 55/04* (2006.01)
*F15B 1/24* (2006.01)

(52) U.S. Cl.
CPC ............. *F15B 1/24* (2013.01); *F15B 2201/205* (2013.01); *F15B 2201/31* (2013.01); *F15B 2201/4053* (2013.01); *F15B 2201/4056* (2013.01)

(58) Field of Classification Search
CPC .... F15B 1/24; F15B 2201/05; F15B 2201/31; F15B 2201/312
USPC ......... 138/26, 27, 28, 30, 31, 89; 251/129.08; 137/625.61; 903/960; 180/165
See application file for complete search history.

(56) References Cited

U.S. PATENT DOCUMENTS

| | | | | |
|---|---|---|---|---|
| 1,841,337 | A | 1/1932 | Roessler | |
| 1,879,020 | A | 9/1932 | Balsiger | |
| 2,005,813 | A | 6/1935 | Thorsen | |
| 2,011,333 | A | 8/1935 | Clifton | |
| 2,118,398 | A * | 5/1938 | Farmer | 137/801 |
| 2,352,041 | A * | 6/1944 | Van Den Berg | 138/31 |
| 2,417,873 | A | 3/1947 | Huber | |
| 2,703,108 | A | 3/1955 | McCuistion | |
| 2,715,419 | A | 8/1955 | Ford et al. | |
| 2,734,531 | A * | 2/1956 | Bizak | 138/31 |
| 2,742,929 | A * | 4/1956 | Treseder | 138/31 |
| RE24,223 | E | 9/1956 | Ford et al. | |
| 2,928,417 | A | 3/1960 | Buckner et al. | |
| 3,004,561 | A * | 10/1961 | Henry | 138/31 |
| 3,850,195 | A | 11/1974 | Olsson | |
| 4,187,682 | A | 2/1980 | Shen | |
| 4,207,563 | A * | 6/1980 | Soupal | 340/626 |

(Continued)

*Primary Examiner* — Patrick F Brinson
*Assistant Examiner* — Matthew Lembo
(74) *Attorney, Agent, or Firm* — Fraser Clemens Martin & Miller LLC; William J. Clemens

(57) ABSTRACT

An accumulator assembly comprises an accumulator cylinder formed of a cylindrical, gas-impermeable shell and a cylindrical gas-impermeable sleeve disposed within and substantially concentric with the shell. An interstitial space is formed between the sleeve and the shell. A piston slidably is disposed within the sleeve, the piston separating an interior of the sleeve into a first chamber configured to contain a compressed gas, and a second chamber configured to contain a pressurized fluid. A pair of removable axial closures retained to the gas-impermeable sleeve at opposing ends and sealingly engaged with corresponding opposing ends of the gas-impermeable shell is configured to provide maximum resistance to the tensional stress of the sleeve.

16 Claims, 13 Drawing Sheets

(56) References Cited

U.S. PATENT DOCUMENTS

| | | | | | |
|---|---|---|---|---|---|
| 4,432,393 | A * | 2/1984 | Mills | 138/30 |
| 4,500,487 | A * | 2/1985 | Christie et al. | 376/283 |
| 4,518,955 | A | 5/1985 | Meyer | |
| 4,577,663 | A | 3/1986 | Andersen et al. | |
| 4,611,634 | A | 9/1986 | Kruckewitt et al. | |
| 4,714,094 | A | 12/1987 | Tovagliaro | |
| 4,997,009 | A * | 3/1991 | Niikura et al. | 138/30 |
| 5,018,547 | A | 5/1991 | Alcorn | |
| 5,098,354 | A | 3/1992 | Kuwayama et al. | |
| 5,483,994 | A * | 1/1996 | Maurer | 138/31 |
| 5,507,144 | A | 4/1996 | Gray, Jr. et al. | |
| 5,603,244 | A * | 2/1997 | Tischer | 74/500.5 |
| 5,771,936 | A | 6/1998 | Sasaki et al. | |
| 6,068,022 | A | 5/2000 | Schultz et al. | |
| 6,390,133 | B1 | 5/2002 | Patterson et al. | |
| 6,418,970 | B1 * | 7/2002 | Deul | 138/31 |
| 6,478,051 | B1 | 11/2002 | Drumm et al. | |
| 6,619,325 | B2 | 9/2003 | Gray, Jr. | |
| 6,631,734 | B2 | 10/2003 | Smith, III | |
| 6,644,354 | B2 | 11/2003 | Dinkel et al. | |
| 6,834,680 | B2 | 12/2004 | Baugh | |
| 6,866,066 | B2 | 3/2005 | Weber | |
| 6,971,411 | B1 * | 12/2005 | Draper | 138/30 |
| 7,066,208 | B2 | 6/2006 | Kort et al. | |
| 7,097,748 | B2 | 8/2006 | Duffy et al. | |
| 7,108,016 | B2 * | 9/2006 | Moskalik et al. | 138/31 |
| 7,121,304 | B2 * | 10/2006 | Gray, Jr. | 138/30 |
| 7,493,916 | B2 * | 2/2009 | Rose | 138/30 |
| 7,661,442 | B2 * | 2/2010 | O'Brien et al. | 138/31 |
| 7,918,246 | B2 * | 4/2011 | Stroganov | 138/30 |
| 8,020,587 | B2 * | 9/2011 | Gray, Jr. | 138/31 |
| 8,056,666 | B2 * | 11/2011 | Portell et al. | 180/165 |
| 8,291,938 | B2 * | 10/2012 | Kennedy et al. | 138/31 |
| 8,389,180 | B2 * | 3/2013 | Hawkes et al. | 429/517 |
| 2003/0075225 | A1 * | 4/2003 | Dinkel et al. | 138/31 |
| 2003/0111124 | A1 * | 6/2003 | Gray, Jr. | 138/30 |
| 2005/0028879 | A1 * | 2/2005 | Suzuki | 138/26 |
| 2005/0061379 | A1 * | 3/2005 | Mori et al. | 138/31 |
| 2005/0155658 | A1 * | 7/2005 | White | 138/31 |
| 2005/0224122 | A1 * | 10/2005 | Kort et al. | 138/31 |
| 2006/0075892 | A1 | 4/2006 | Dorr | |
| 2007/0044461 | A1 | 3/2007 | Burdick et al. | |
| 2007/0084516 | A1 * | 4/2007 | Rose | 138/30 |
| 2007/0102052 | A1 * | 5/2007 | Yoshihara et al. | 138/30 |
| 2008/0308168 | A1 * | 12/2008 | O'Brien et al. | 138/31 |
| 2008/0314467 | A1 * | 12/2008 | Gray, Jr. | 138/31 |
| 2009/0007863 | A1 * | 1/2009 | Matsuda | 123/90.14 |
| 2009/0007979 | A1 * | 1/2009 | Isono et al. | 138/30 |
| 2009/0126815 | A1 * | 5/2009 | Rajabi et al. | 138/31 |
| 2009/0133768 | A1 * | 5/2009 | Miyake et al. | 138/30 |
| 2009/0158877 | A1 * | 6/2009 | Vernacchia et al. | 74/473.24 |
| 2009/0293977 | A1 * | 12/2009 | Lauterbach | 138/31 |
| 2009/0293978 | A1 * | 12/2009 | Lauterbach | 138/31 |
| 2010/0050622 | A1 * | 3/2010 | Stroganov | 60/413 |
| 2010/0050623 | A1 * | 3/2010 | O'Brien, II | 60/413 |
| 2010/0084033 | A1 * | 4/2010 | Hummelt | 138/30 |
| 2010/0206389 | A1 * | 8/2010 | Kennedy et al. | 137/14 |
| 2011/0023977 | A1 * | 2/2011 | Fong et al. | 137/340 |
| 2012/0305120 | A1 * | 12/2012 | Kennedy et al. | 138/31 |

* cited by examiner

ULTRA LIGHTWEIGHT AND COMPACT ACCUMULATOR

CROSS-REFERENCE TO RELATED APPLICATION

This application claims the benefit to provisional patent application No. 61/385,328 entitled "ULTRALIGHT-WEIGHT AND COMPACT ACCUMULATOR" filed Sep. 22, 2010.

FIELD OF THE INVENTION

This invention relates generally to accumulators for high pressure applications, and more particularly to high pressure accumulators of the piston-in-sleeve (or "piston and sleeve") type. This invention further relates to the potential use of such accumulators in conjunction with fuel efficient hydraulic hybrid motor vehicles.

BACKGROUND OF THE INVENTION

Presently, hybrid powertrains are an increasingly popular approach to improving the fuel utilization of motor vehicles. "Hybrid" refers to the combination of a conventional internal combustion engine with an energy storage system, which typically serves the functions of receiving and storing excess energy produced by the engine and energy recovered from braking events, and redelivering this energy to supplement the engine when necessary. This decouples the production and consumption of power, thereby allowing the internal combustion engine to operate more efficiently, while making sure that enough power is available to meet load demands.

Several forms of energy storage are known in the art, with electrical storage using batteries being the best known. Recently, hydraulic hybrids have been demonstrated to offer better efficiency, greater power density, lower cost, and longer service life than electric hybrids. A hydraulic power system takes the form of one or more hydraulic accumulators for energy storage and one or more hydraulic pumps, motors, or pump/motors for power transmission. Hydraulic accumulators operate on the principle of storing energy by compressing a gas. An accumulator's pressure vessel contains a charge of gas, typically nitrogen, which becomes compressed as a hydraulic pump pumps liquid into the vessel. The liquid thereby becomes pressurized and when released may be used to drive a hydraulic motor. A hydraulic accumulator thus utilizes two distinct working media, one a compressible gas and the other a relatively incompressible liquid. Throughout this document, the term "gas" shall refer to the gaseous medium and the term "fluid" shall refer to the liquid working medium, as is customary in the art.

In the present state of the art, there are three basic configurations for hydraulic accumulators: spring type, bladder type and piston type. Spring type are typically limited to accumulators with small fluid volumes due to the size, cost, mass, and spring rates of the springs. Bladder accumulators typically suffer from high gas permeation rates and poor reliability. Of these, the piston type is the least costly design that can store desirable volumes of fluid. In addition, properly designed piston accumulators are physically robust, efficient, and reliable.

Standard piston accumulators are also well represented in the art. In a standard piston accumulator, the hydraulic fluid is separated from the compressed gas by means of a piston, which seals against the inner walls of a cylindrical pressure vessel and is free to move longitudinally as fluid enters and leaves and the gas compresses and expands. Because the piston does not need to be flexible, it may be made of a gas impermeable material such as steel. However, the interface between the piston and the inner wall of the cylinder must be controlled tightly to ensure a good seal, and the degree of dimensional tolerance necessary to ensure a good seal may increase the cost of manufacturing. It also requires that the pressure vessel be extremely rigid and resistant to expansion near its center when pressurized, which would otherwise defeat the seal by widening the distance between the piston and cylinder wall. This has eliminated the consideration of composite materials for high pressure piston accumulator vessels, as composite materials tend to expand significantly under pressure (e.g., about 1/10 of an inch diametrically for a 12 inch diameter vessel at 5,000 psi pressure).

As a result of the foregoing, standard piston accumulator vessels tend to be made of thick, high strength steel and are very heavy. Standard piston accumulators have a much higher weight to energy storage ratio than either steel or composite bladder accumulators, which makes them undesirable for mobile vehicular applications (as such increased weight would, for example, reduce fuel economy for the vehicle). More specifically, piston accumulators for the same capacity (i.e., size) and pressure rating are many times heavier (e.g., by up to 10 times) than an accumulator with a lightweight composite pressure vessel design, as would be preferred in such applications where accumulator weight is an issue. Therefore, despite their potentially superior gas impermeability, piston accumulators are largely impractical for vehicular applications.

Several prior art piston accumulator concepts utilize a piston-in-sleeve accumulator design, in which the piston resides within and seals against a cylindrical sleeve that is separate from the inner wall of the pressure vessel. The sleeve is defined as a hollow member substantially incapable of withstanding stresses applied thereto were a full pressure differential of the accumulator applied across a hollow member. While this approach provides at least two benefits over the prior art: (i) separating the pressure containment function of the vessel wall from its piston sealing function, allowing an effective seal to be pursued with a sleeve independently of issues relating to pressure vessel construction, and (ii) providing an intervening or interstitial volume between the sleeve and vessel wall which may be filled with the charge gas to allow tailoring of the ratio of gas to fluid to optimize performance and which also allows shaping the pressure profile of the discharged oil.

A disadvantage of these systems is that such designs comprise a generally thick-walled strong cylindrical pressure vessel constructed of a steel alloy, and a metal sleeve that is thin relative to the vessel walls. The sleeve is permanently attached to the inner surface of one end of the pressure vessel near its circumference, creating (with the piston) a closed or "inside" chamber for the working fluid. The other end of the sleeve extends toward the other end of the vessel and is generally left open to create an "outside" chamber that consists of the open volume of the sleeve, the remaining volume of the pressure vessel, and the intervening/interstitial space between the outer wall of the sleeve and the inner wall of the pressure vessel, each filled with the gaseous medium of the accumulator.

Another disadvantage of these systems is the operation of such requires the sleeve to be tightly retained and centered within the vessel to prevent radial movement, for example, due to vibrations in use with mobile (e.g. aircraft) applications. Sleeve movement fatigues the rigid fixed end of the sleeve possibly leading to leakage due to cracking, distortion, or wear of the sealing gasket if one is present. This requires the sleeve to either be stiffened by connecting it at points to the vessel wall, or requires the sleeve to be thicker than the minimum that would be necessary to withstand the small pressure differentials normally encountered in charging and discharging. Further, the outer walls of the vessel must be thicker than would be necessary for pressure containment alone because the walls must be prevented from expanding and thus loosening the sleeve or distorting it from the true circular form necessary for piston sealing.

Prior art piston-in-sleeve designs also uniformly contain the fluid within the closed (inside) chamber, with the charge gas residing on the other side of the piston and in the interstitial space between the sleeve and vessel wall. This arrangement is naturally preferable because it maximizes the fluid capacity and hence energy capacity of the device. That is, the working medium that resides inside the sleeve may be discharged completely, while some portion of the medium outside the sleeve will always remain trapped in the interstitial space; because working capacity is determined by how much fluid may be discharged, it is a natural choice to have the fluid reside on the inside of the sleeve and gas on the outside.

Like standard piston accumulators discussed above, these prior art piston-in-sleeve accumulators are unacceptably heavy for a hydraulic hybrid motor vehicle application or other application where accumulator weight is a significant issue. Attempts have been made to reduce the weight of such piston-in-sleeve accumulators through the use of lightweight composite materials in place of steel for the pressure containment function in the vessel wall. However, such devices still require an internal metallic core to the vessel wall and a thickened metal area at one end of the accumulator. As such, the device remains undesirably heavy for a hydraulic hybrid motor vehicle application. The intense duty cycle experienced by the accumulator (i.e., the extremely large number of charge-discharge cycles, in some cases exceeding one million cycles) and the significant radial expansion of composite materials (about 1/10 of one inch diametrically for a 12 inch diameter vessel at 5,000 psi pressure) together would result in expected fatigue failure of the metal core or liner.

To resolve these shortcomings, prior art devices employ a thermoplastic sleeve, with a carbon-fiber wound pressure vessel shell. The device also places the fluid outside the core, thus the fluid fills the interstitial spaces. There are several significant issues with this design: (i) the physical size of the accumulator is larger than necessary to enclose the same volume of useful working fluid as the fluid in the interstitial spaces cannot be used; (ii) optimal accumulator design require that the gas volume be greater than the fluid volume; (iii) the design cannot be serviced—any failure of any component requires that the entire cylinder be discarded, (iv) the thickness of the pressure vessel wrapping is thicker than needed because the wrapping must counter both axial and tangential loads, and (v) the design does not provide the means to protect the integrity of the sleeve should the oil pressure exceed that of the gas pressure.

Most recently, a compact hydraulic accumulator has been developed that provides a serviceable piston and sleeve design using an extremely light-weight composite pressure vessel. The modular design provides accumulator cylinders and auxiliary gas cylinders in fluid communication via manifolds doubling as removable end caps with ties rods maintaining the module in tension. Such a device is disclosed in commonly owned U.S. Pat. No. 7,661,442, incorporated herein by reference in its entirety.

A drawback to this device is the bulk of the end caps housing the manifold along with the tie rods required to seal the vessel. These components add substantially to the package space required to fit into a vehicle. A more compact end cap would improve the utility of the accumulator by virtue of reducing its size and package requirements.

SUMMARY OF THE INVENTION

In concordance and agreement with the present invention, an ultra lightweight and compact accumulator has surprisingly been discovered.

In one embodiment, an accumulator assembly comprises at least one accumulator cylinder, including a cylindrical, gas-impermeable shell; a cylindrical gas-impermeable sleeve disposed within and substantially concentric with the shell, an interstitial space formed between the sleeve and the shell; a piston slidably disposed within the sleeve, the piston separating an interior of the sleeve into a first chamber configured to contain a compressed gas, and a second chamber configured to contain a pressurized fluid; and a pair of removable axial closures retained to the gas-impermeable sleeve at opposing ends and sealingly engaged with corresponding opposing ends of the gas-impermeable shell, the axial closures configured to provide maximum resistance to the tensional stress of the sleeve.

In another embodiment, an accumulator system comprises an accumulator assembly, including a plurality of accumulator cylinders, each having a cylindrical, gas-impermeable shell, a cylindrical gas-impermeable sleeve disposed within and substantially concentric with the shell, an interstitial space formed between the sleeve and the shell, a piston slidably disposed within the sleeve, the piston separating an interior of the sleeve into a first chamber configured to contain a compressed gas, and a second chamber configured to contain a pressurized fluid, a pair of removable axial closures retained to the gas-impermeable sleeve at opposing ends and sealingly engaged with corresponding opposing ends of the gas-impermeable shell, wherein at least one of the axial closures includes a gas port and a fluid port formed therein; and a removable manifold housing comprising a gas manifold and a fluid manifold fluidly connecting respective fluid ports and gas ports of the axial closures of each accumulator cylinder.

In another embodiment, an accumulator assembly comprises a fluidly sealed housing; at least one accumulator cylinder within the housing, the cylinder including a cylindrical, gas-impermeable shell; a cylindrical gas-impermeable sleeve disposed within and substantially concentric with the shell, an interstitial space formed between the sleeve and the shell; a piston slidably disposed within the sleeve, the piston separating an interior of the sleeve into a first chamber configured to contain a compressed gas, and a second chamber configured to contain a pressurized fluid; a pair of removable axial closures retained to the gas-impermeable sleeve at opposing ends and sealingly engaged with corresponding opposing ends of the gas-impermeable shell, wherein at least one of the axial closures includes a gas port and a fluid port formed therein; and a removable manifold housing comprising a gas manifold and a fluid manifold fluidly connecting respective fluid ports and gas ports of the axial closures of each accumulator cylinder; a relief valve fluidly connected to the gas manifold and the fluid manifold; and a drain relief port formed through a wall of the manifold housing configured to drain one of the fluid and gas into the housing.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

The following detailed description and appended drawings describe and illustrate various exemplary embodiments of the invention. The description and drawings serve to enable one skilled in the art to make and use the invention, and are not intended to limit the scope of the invention in any manner.

Figure 1A:
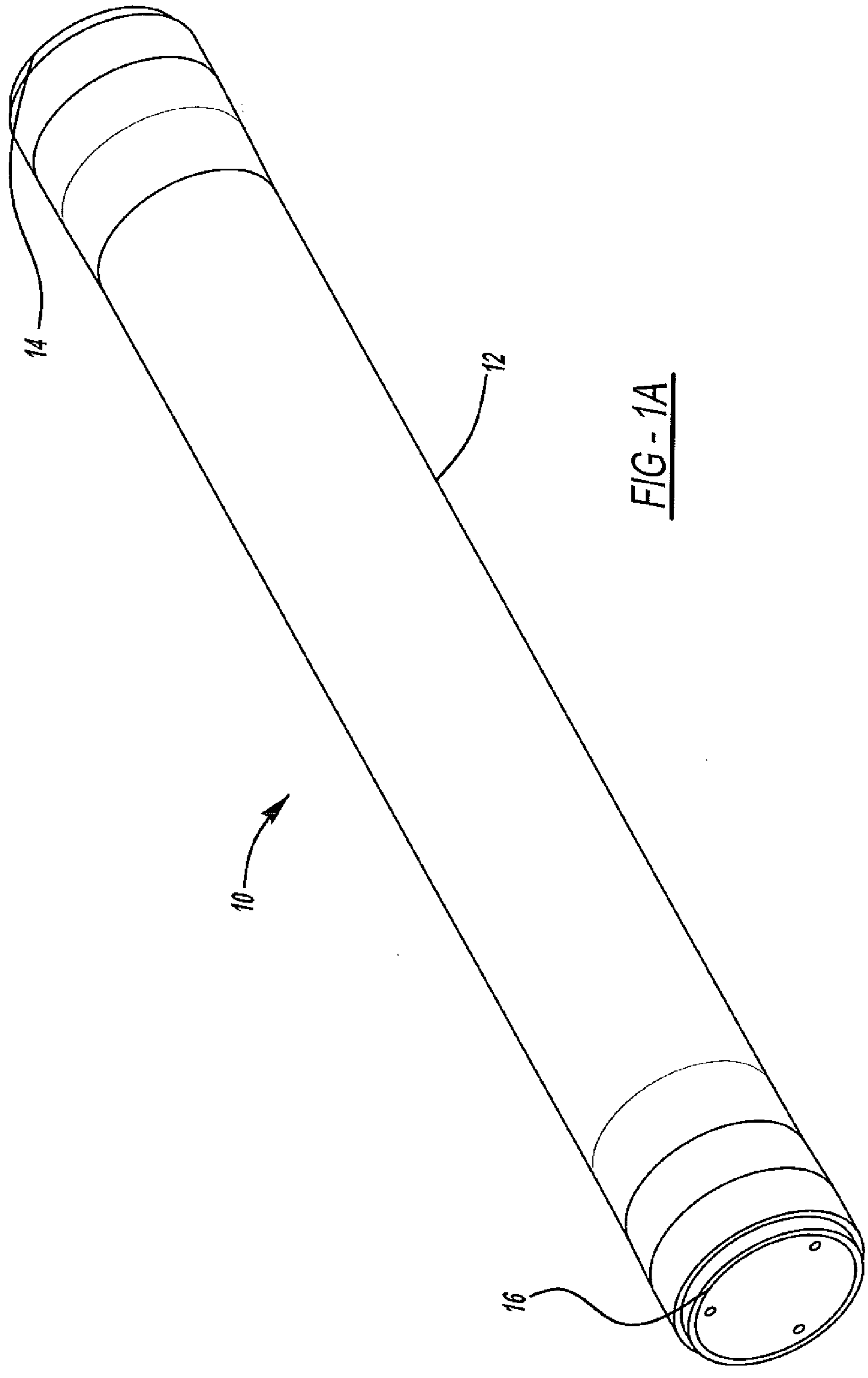
FIG. 1A illustrates a plan view of an ultra lightweight and compact accumulator of the present invention.

FIG. 1A illustrates an ultra lightweight and compact accumulator 10 of the present invention including a cylinder 12 having a pair of axial closures 14, 16 at opposing ends of the cylinder 12.

Figure 1B:
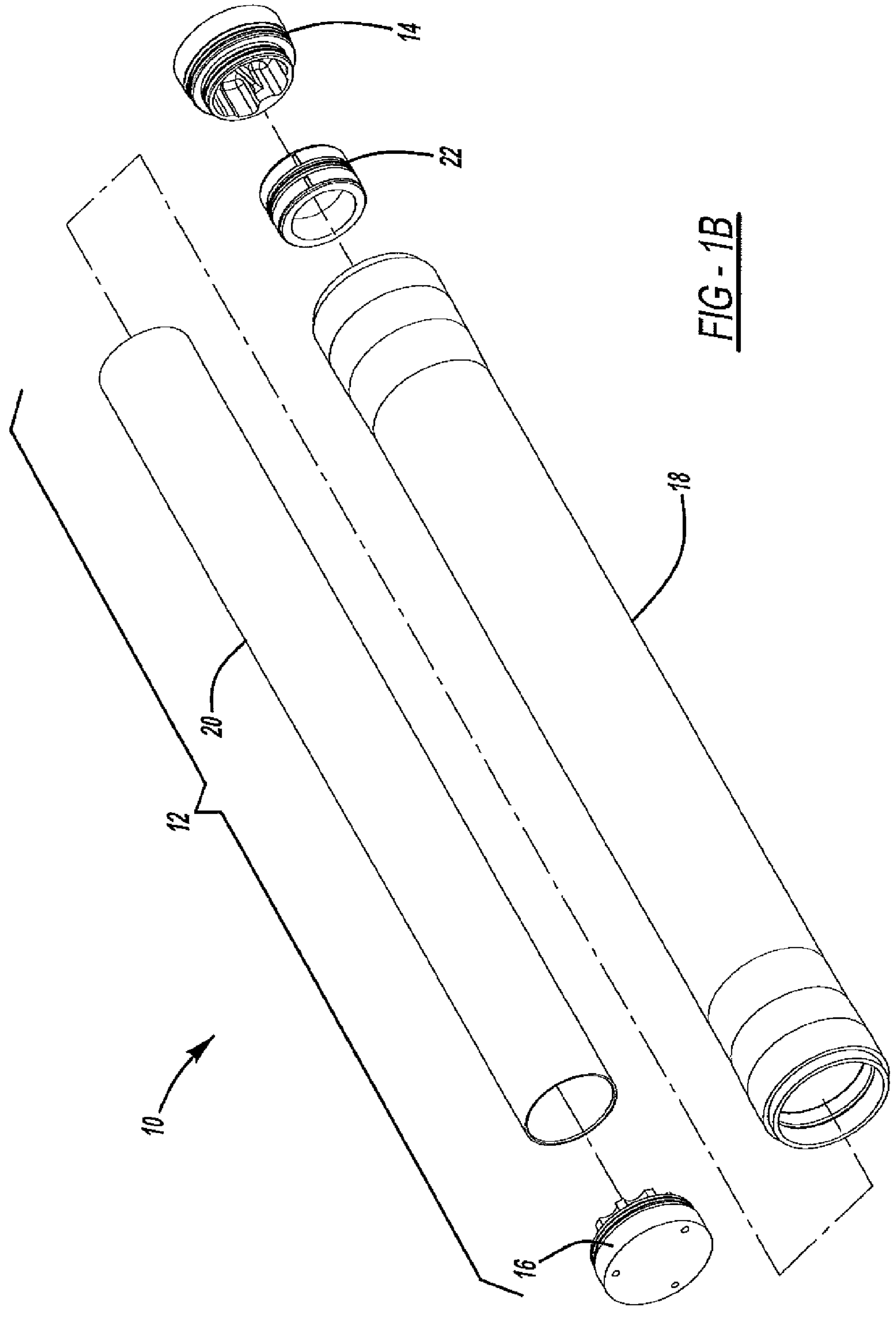
FIG. 1B illustrates an exploded side perspective view of the ultra lightweight and compact accumulator illustrated in FIG. 1A.

FIG. 1B illustrates an exploded view of the cylinder 12 of the compact accumulator 10. The cylinder 12 is preferably formed of a cylindrical substantially gas-impermeable shell 18 with a cylindrical substantially gas-impermeable sleeve 20 disposed within the shell 18. A piston 22 is slidably disposed within the sleeve 20. The pair of axial closures 14, 16 are retained to sleeve 20 and are sealingly engaged with the shell 18.

Figure 2:
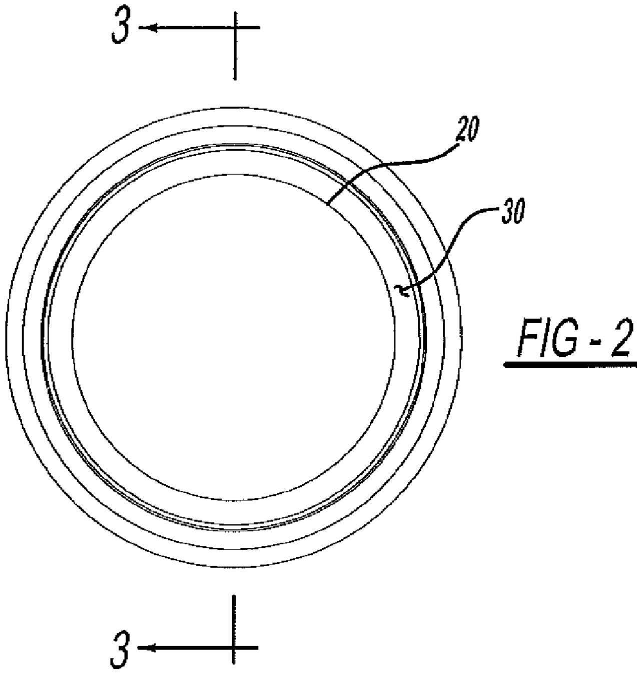
FIG. 2 illustrates one end of the cylinder forming the ultra lightweight and compact accumulator illustrated in FIGS. 1A and 1B.
Figure 3A:
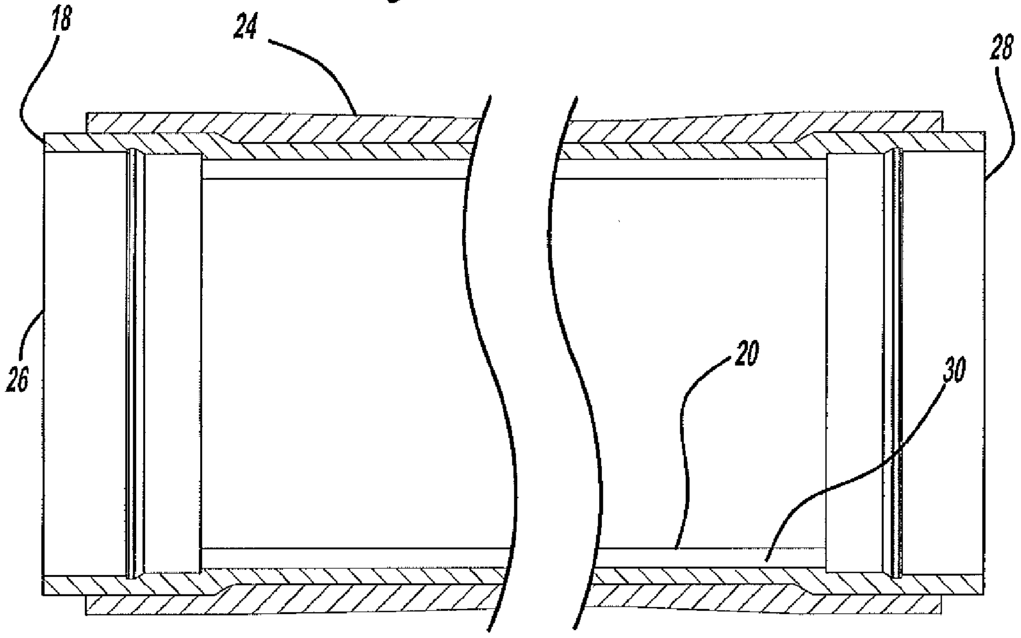
FIG. 3A illustrates is an enlarged fragmentary cross-sectional side-elevational view of a portion of the cylinder illustrated in FIG. 2 taken along section line 3-3.
Figure 3B:
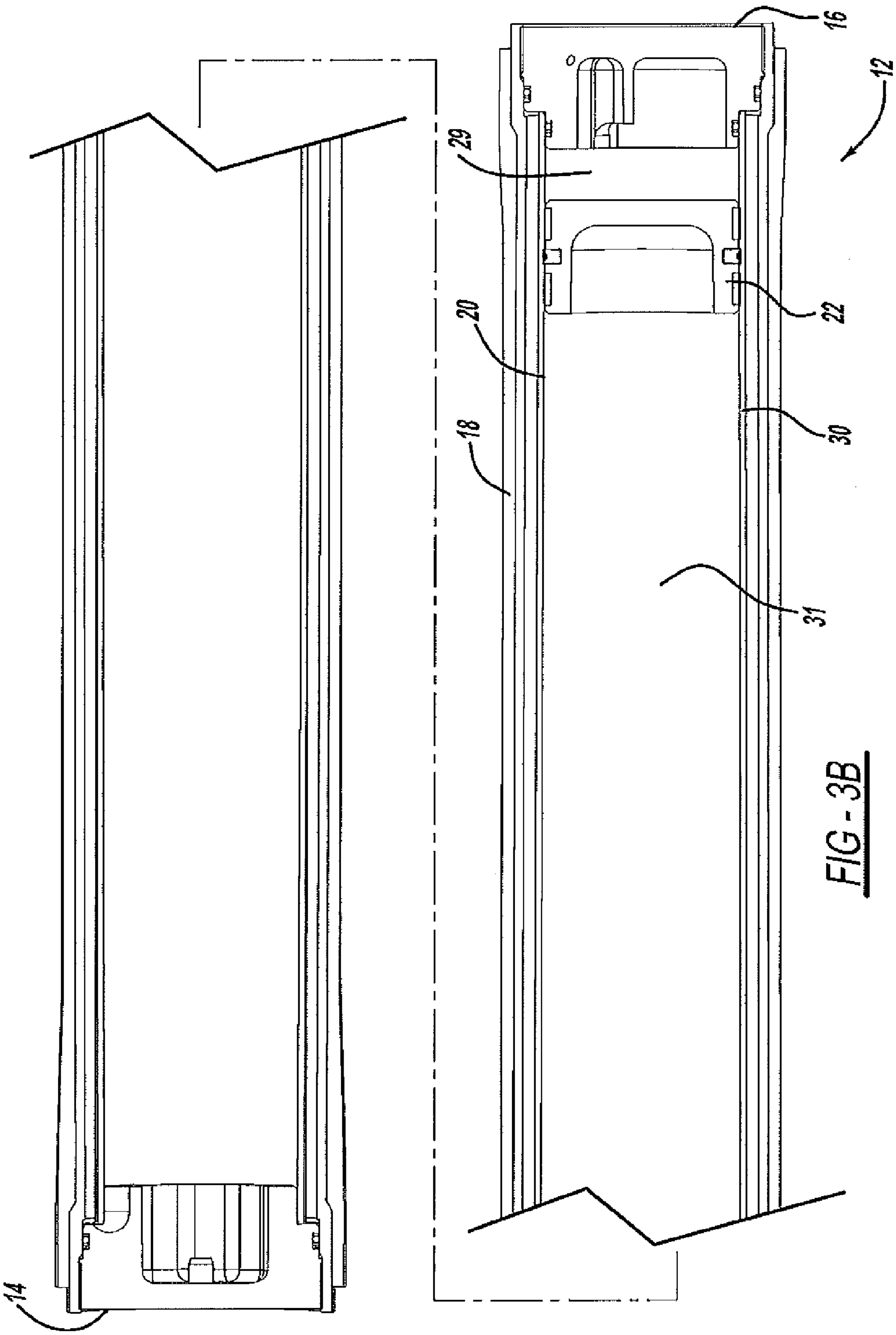
FIG. 3B illustrates a cross-section of the cylinder.

FIGS. 2 and 3A-3B more clearly illustrate the sleeve 20 disposed within the Shell 18. The shell 18 is substantially gas-impermeable. The shell 18 may be formed from any suitable material, such as at least one of a metal, a polymer, and a composite material, as desired. The shell may be formed from a material that is optimized for strength in relation to directional stresses, such as one of an axial stress and a hoop stress, for example. The shell 18 may have an overwrap 24, as desired, to contain the hoop stress. The overwrap 24 is typically formed of a strong lightweight material such as carbon fiber, E-glass, or other suitable material as known in the art. The material of the overwrap 24 may be wrapped to maximize an angle between the over-wrap 24 and an axial axis of the accumulator cylinder 12. In a preferred embodiment, the material is carbon fiber oriented purely radially. To avoid separation due to longitudinal stress, a releasing agent is provided on the outside of the cylinder 12 prior to carbon winding. The releasing agent allows the carbon fiber to break free from the cylinder 12 before substantial strain is transferred to the carbon windings, thus eliminating the possibility of the carbon fibers separating axially and failing to support the cylinder 12 under pressure.

A first metal boss 26 resides at one end of the cylinder 12 and a second metal boss 28 resides at the opposing end of the cylinder 12. The shell 18 is affixed to the first metal boss 26 and the second metal boss 28 using any substantially gas-impermeable means know in the art such as welding, adhesive, sealant, and the like.

The inner sleeve 20 is disposed between the first metal boss 26 and the second metal boss 28. The inner sleeve 20 is divided into two chambers: a gas-side chamber 29 and a fluid-side chamber 31, The gas-side chamber 29 is configured to contain a gas, such as nitrogen, helium, or other suitable gas as known in the art. The fluid-side chamber 31 is configured to contain a fluid such as hydrocarbon oil or other suitable fluid or gas known in the art. The two chambers 29, 31 are described and illustrated in commonly owned U.S. Pat. No. 7,661,442 and incorporated by reference herein.

The inner sleeve 20 may be readily removable and replaceable for easy servicing. The first metal boss 26 and the second metal boss 28 preferably hold the inner sleeve in place. A damaged inner sleeve 20 may be inexpensively and easily repaired or removed and replaced. The inner sleeve 20 may be constructed from a light-weight, substantially gas-impermeable material such as a composite material, or sheet metal for example.

An interstitial space 30 is formed between the shell 18 and the inner sleeve 20. The size of the inner sleeve 20 and the shell 18 may be chosen to contain a desired quantity of gas within the interstitial space 30.

Figure 4A:
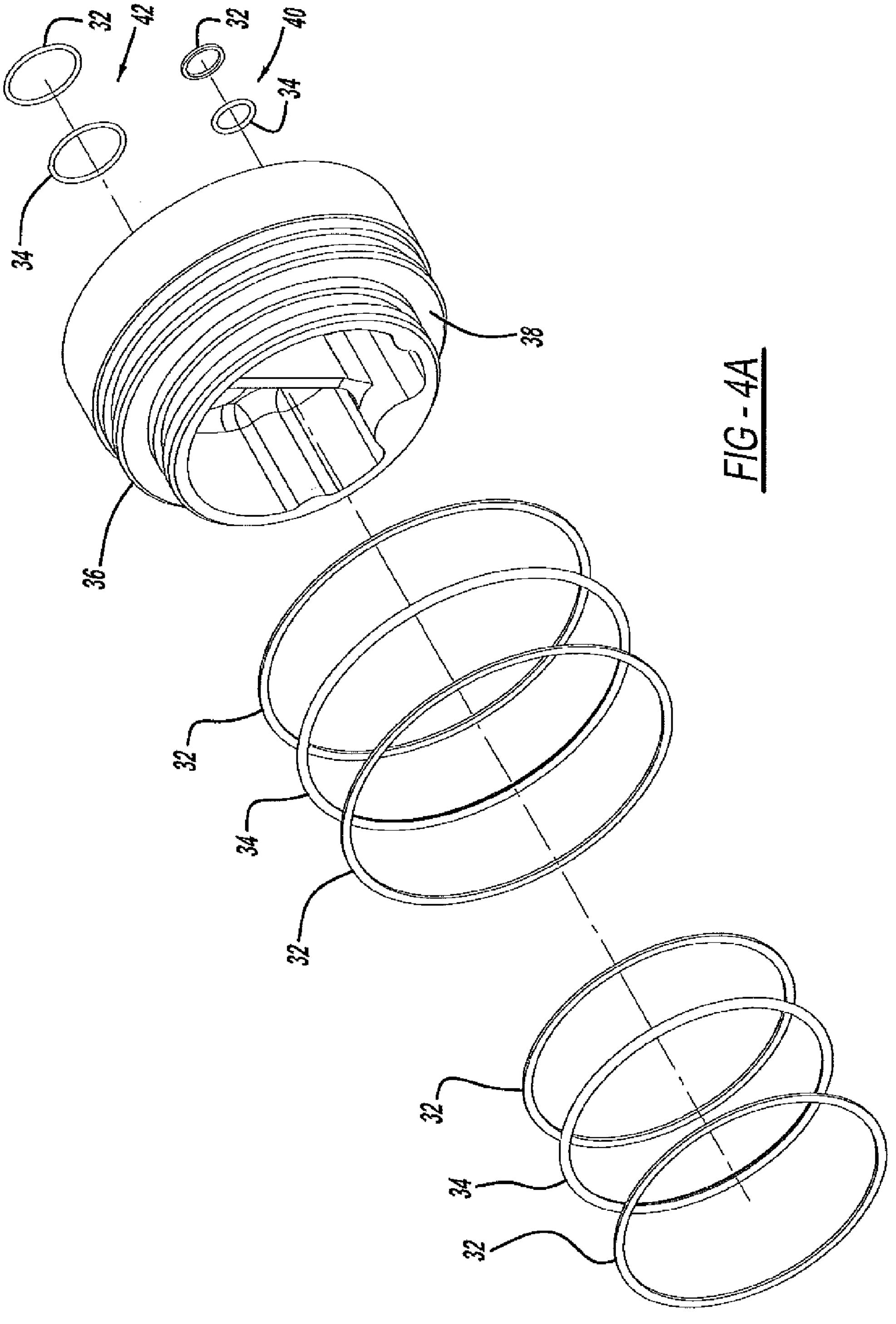
FIG. 4A illustrates an exploded side perspective view of a first axial closure of the ultra lightweight and compact accumulator of the present invention.
Figure 4B:
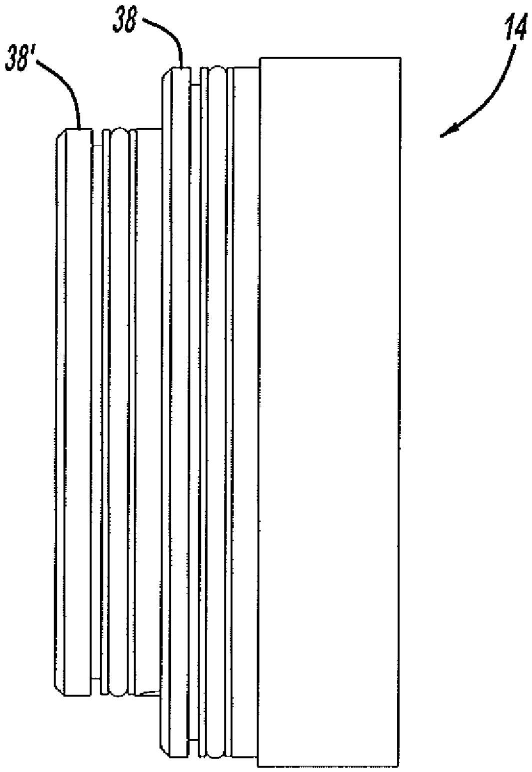
FIG. 4B illustrates a side view of the first axial closure of FIG. 4A.

FIGS. 4A and 4B illustrate a preferred embodiment of the first axial closure 14. The first axial closure 14 is preferably provided on the fluid side of the accumulator cylinder 12 and includes at least one and preferably two sealing sets of backrings 32 surrounding O-rings 34 seated within grooves 36 provided along the stepped periphery 38. The axial closure 14 includes at least one and preferably two ports 40, 42 for receiving and extracting fluid and gas, such as through a manifold and relief valve described below. In a preferred embodiment, a first port 40 is fluidly connected to the gas-side chamber 29 of the sleeve 20, and a second port 42, preferably having the larger opening, is fluidly connected to the fluid-side chamber 31 of the sleeve 20. Each fluid port includes a backring 32 and O-ring 34 for sealing. FIG. 4B best illustrates a side view of the axial closure 14 with a stepped periphery 38, 38'. The smaller diameter periphery 38' sealingly engages the gas impermeable sleeve 20 and is preferably retained in the end of the sleeve 20 by a threaded engagement, while the larger diameter periphery 38 sealingly engages the gas-impermeable shell 18. The threaded engagement of the axial closure 14 with the sleeve 20 transfers the axial load from the axial closure 14 to the sleeve 20. In turn, this introduces substantial axial stress in the sleeve 20 wall, as it now behaves as a closed ended pressure vessel. These tensile stresses will cause axial strain in the sleeve. Since the sleeve is supported radially by the carbon windings described above, the stress state remains substantially uniaxial tension. The axial closure 14 is removable for service of the piston 22 and sleeve 20, and is also readily replaceable. The axial closure 14 seals one end of the accumulator cylinder 12.

Figure 5B:
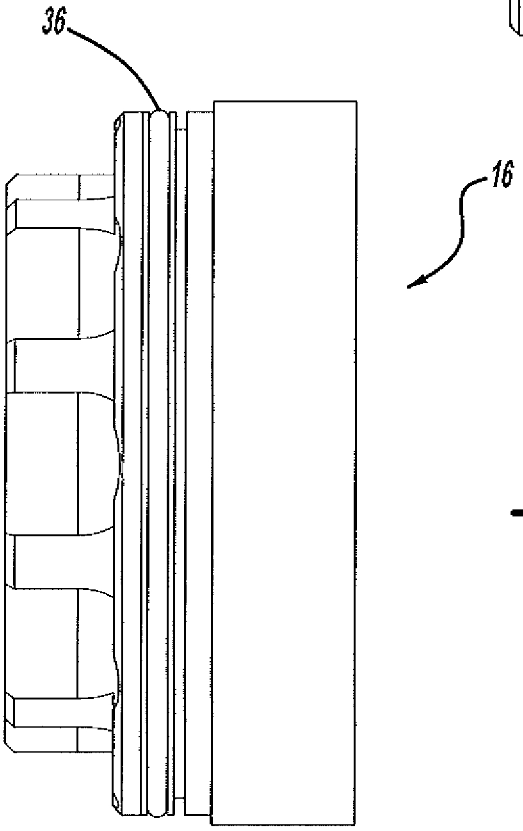
FIG. 5B illustrates a side view of the second axial closure of FIG. 5A.
Figure 5A:
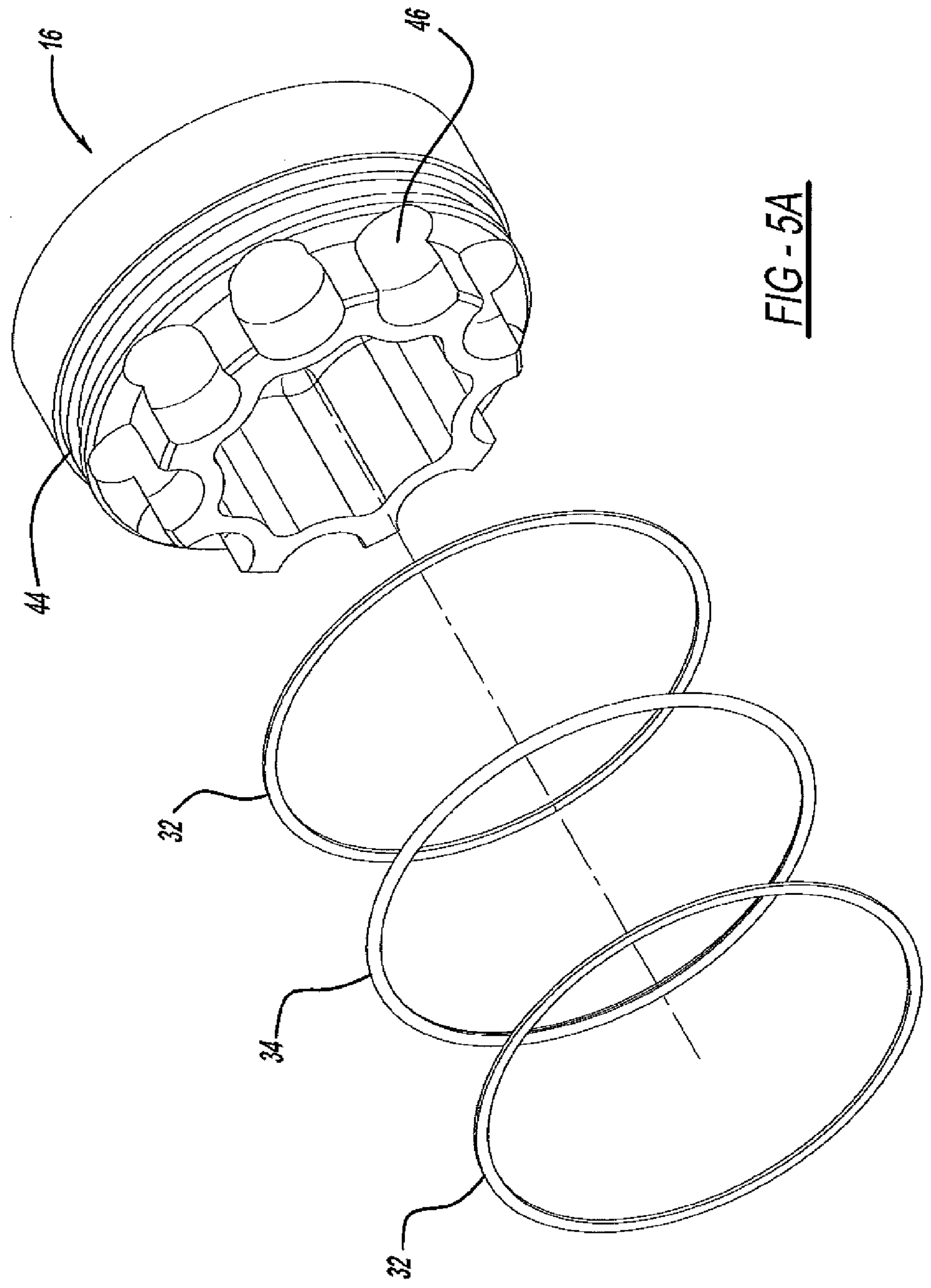
FIG. 5A illustrates an exploded side perspective view of a second axial closure of the ultra lightweight and compact accumulator of the present invention.

FIGS. 5A and 5B illustrate a preferred embodiment of the second axial closure 16. The second axial closure 16 is preferably provided on the gas side of the accumulator cylinder 12 and includes at least one sealing set including a backring 32 surrounding O-rings 34 seated within grooves 36 provided along the periphery 44 of the axial closure 16. The axial closure 16 includes at least one and preferably multiple internal flutes 46 extending about the periphery 44 of the axial closure 16, providing an opening from the gas-side chamber 29 of the sleeve 20 to the interstitial space 30, equalizing gas pressure within the cylinder 20. FIG. 5B illustrates a side view of the axial closure 16 with the flutes 46 extending about the periphery 44. The axial closure 16 is preferably secured in the end of the sleeve 20 by a threaded engagement. The threaded engagement of the axial closure 16 with the sleeve 20 transfers the axial load from the axial closure 16 to the sleeve 20. In turn, this introduces substantial axial stress in the sleeve 20 wall, as it now behaves as a closed ended pressure vessel. These tensile stresses will cause axial strain in the sleeve. Since the sleeve is supported radially by the carbon windings described above, the stress state remains substantially uniaxial tension. The axial closure 16 seals one end of the accumulator cylinder 12.

Figure 5C:
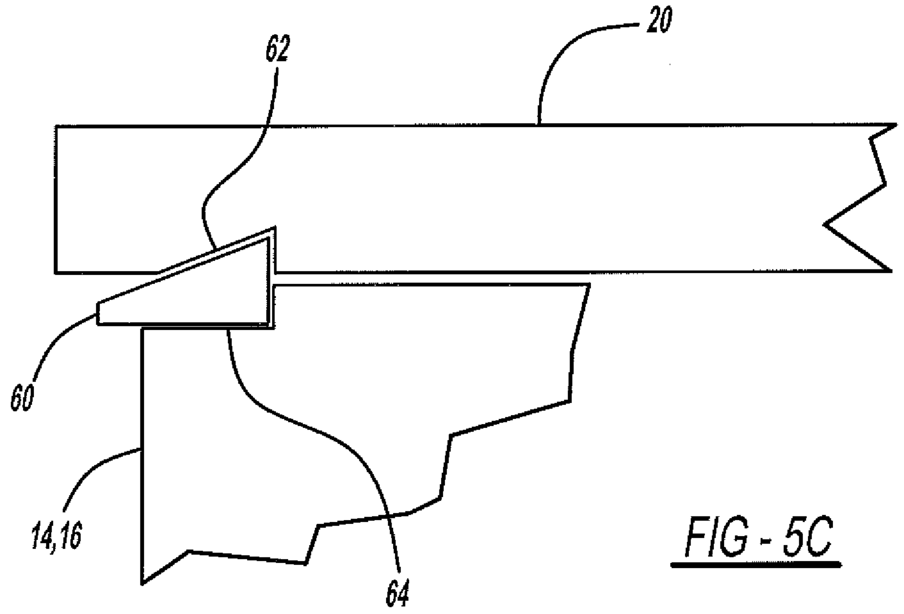
FIG. 5C illustrates an alternative retaining means of an axial closure.
Figure 5D:
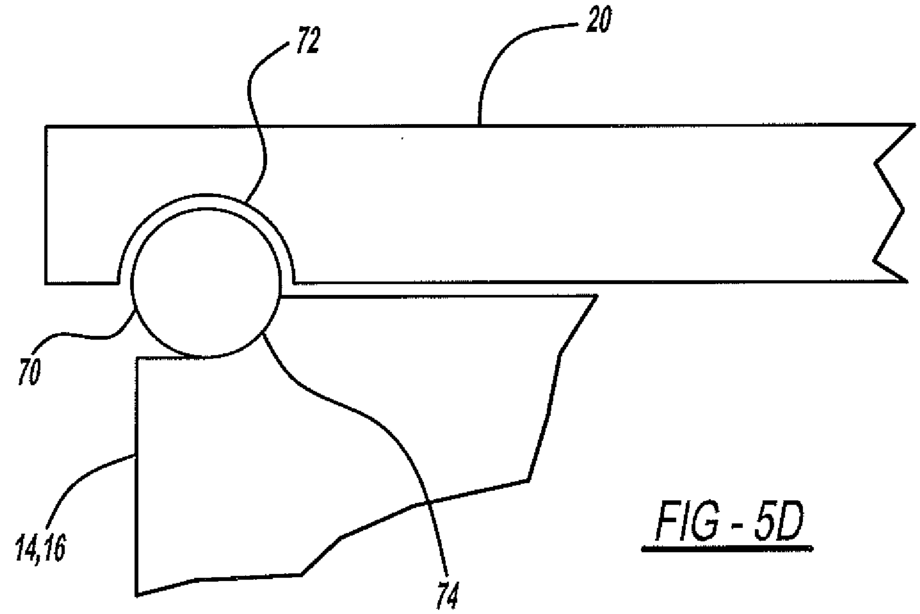
FIG. 5D illustrates an alternative retaining means of an axial closure.

FIGS. 5C and 5D illustrate alternative means for engaging the axial closures 14, 16 with the end of the sleeve 20. With reference to FIG. 5C, a bearing wedge 60 may removably secure an axial closure 14, 16 to a sleeve 20 by a releasable snap fit within corresponding interface 62 and 64 of the sleeve 20 and axial closure 14, 16, respectively. Another means for engaging is illustrated in FIGS. 5D and includes a bearing roller 70 removably securing an axial closure 14, 16 to a sleeve 20 by a releasable snap fit within corresponding interface 72 and 74 of the sleeve 20 and axial closure 14, 16, respectively. The advantage of implementing a bearing wedge 60 and bearing roller 70 is the elimination of costly threading and faster and easier assembly. In the embodiments of FIGS. 5C and 5D, any axial forces applied to the axial closure 14, 16 are absorbed by the wedge 60 or roller 70 and transferring these forces to be absorbed by the shell 18 and the overwrap 24.

Figure 6A:
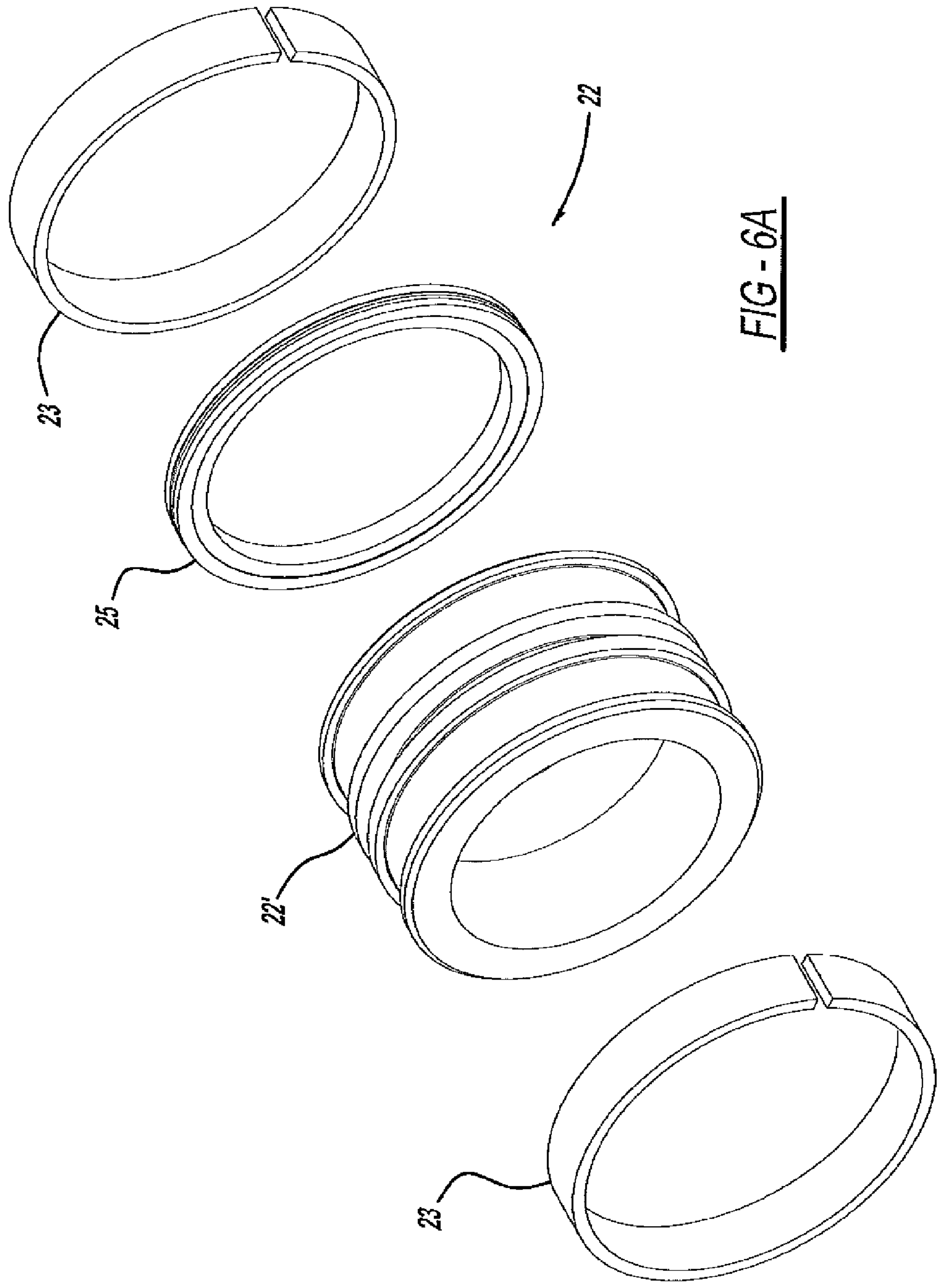
FIG. 6A illustrates an exploded side perspective view of a piston of the ultra lightweight and compact accumulator of the present invention.
Figure 6B:
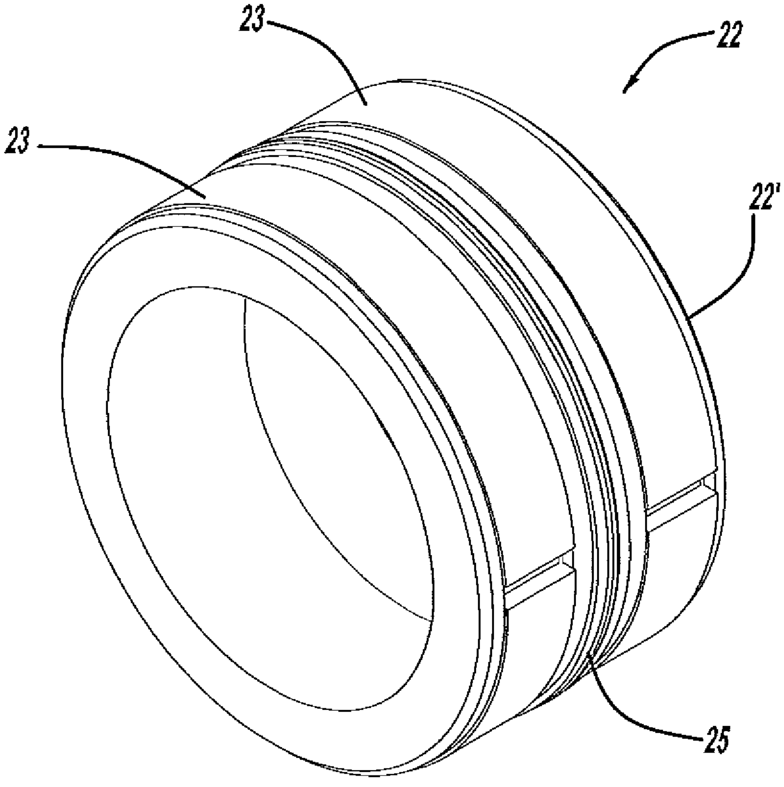
FIG. 6B illustrates a side view of the piston of FIG. 6A.

FIGS. 6A and 6B illustrate the piston assembly 22 that includes an accumulator piston 22' with seated wear rings 23 and O-ring 25 as is well known in the art.

Figure 7A:
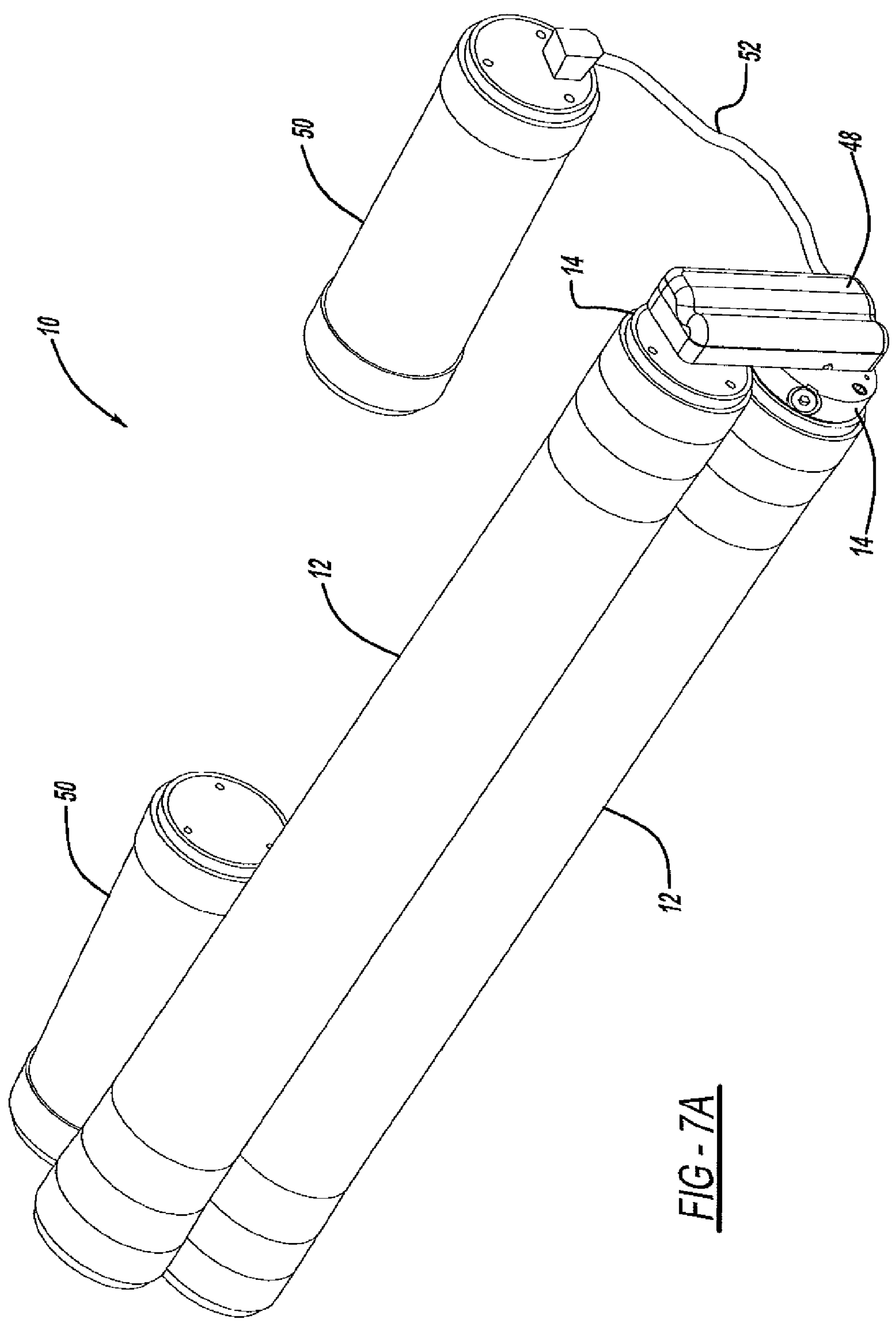
FIG. 7A illustrates a front plan view of the ultra lightweight and compact accumulator assembly with a manifold housing and auxiliary cylinder.
Figure 7B:
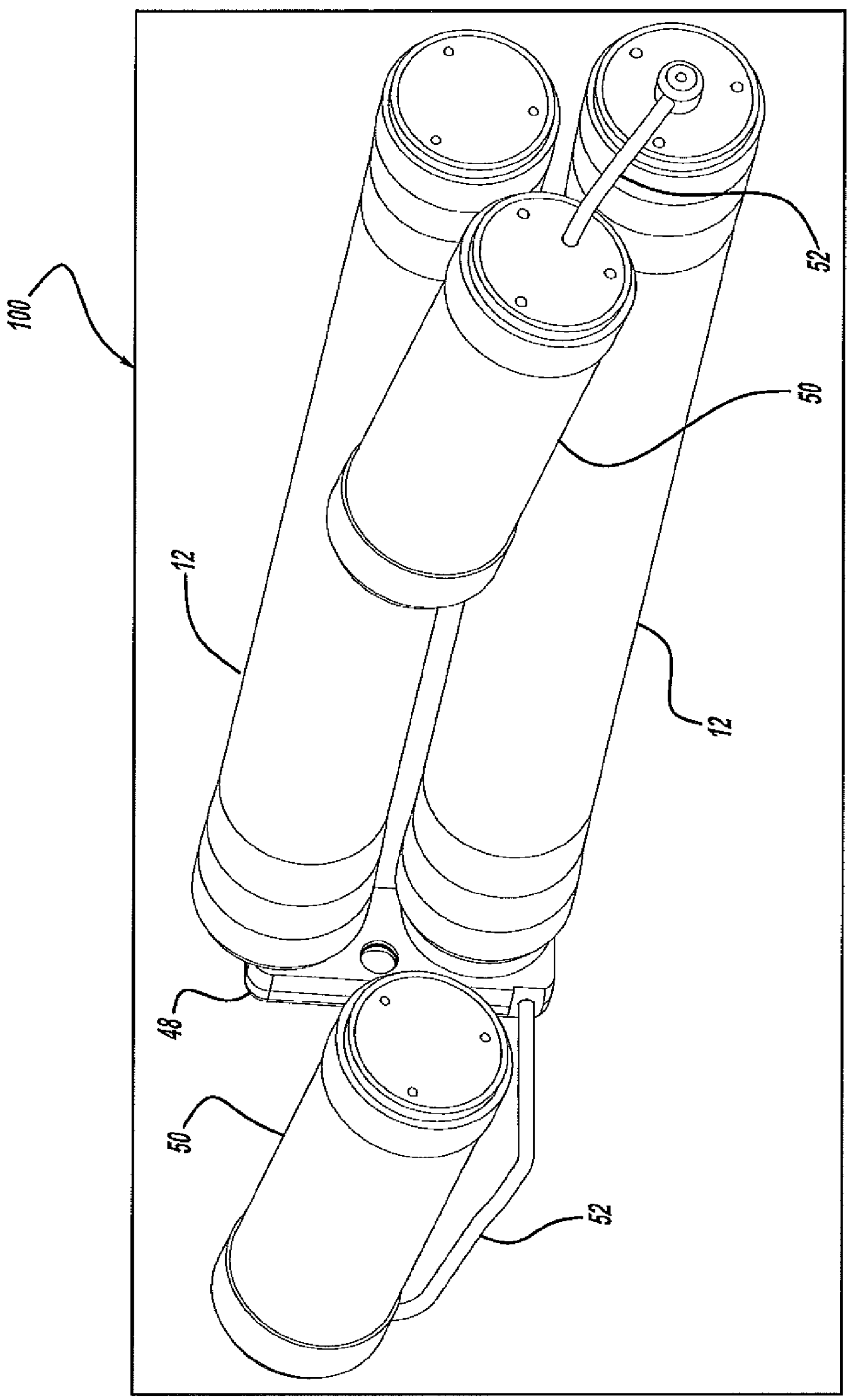
FIG. 7B illustrates a rear plan view of the ultra lightweight and compact accumulator assembly with a manifold housing and auxiliary cylinder.

FIGS. 7A and 7B illustrate the ultra lightweight and compact accumulator 10 having two cylinders 12 connected at the axial closures 14 by a manifold housing 48. Auxiliary cylinders 50 may be provided in fluid communication with the cylinders 12 via any transfer medium that can support the pressure, such as standard steel hydraulic tubing 52.

Figure 8:
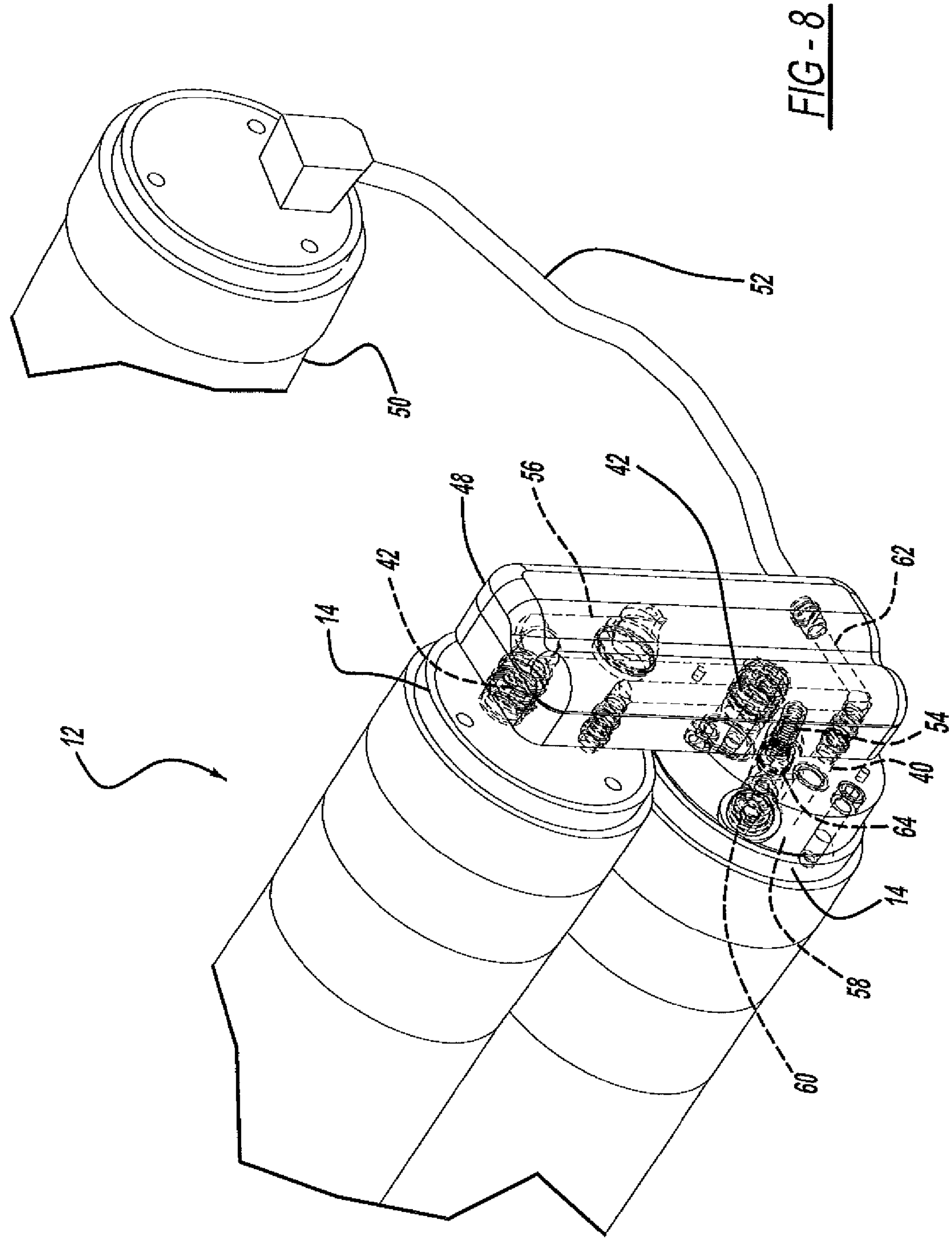
FIG. 8 illustrates an enlarged plan view of the manifold housing of the ultra lightweight and compact accumulator assembly of the present invention.

FIG. 8 illustrates an enlarged view of the manifold housing 48 connecting multiple cylinders 12 at the axial closures 14. The manifold housing 48 includes a gas manifold 54 fluidly connecting two gas ports 40 of two separate cylinders 12 along with a fluid manifold 56 for connecting two fluid ports 42 of the same cylinders 12. An end cap 58 for securing the manifold housing 48 to an axial closure 14 extends from and is fluidly connected with the manifold housing 48 and both the gas manifold 54 and fluid manifold 56. The end cap 58 supports a relief valve 60 that is also fluidly connected with both the gas manifold 54 and the fluid manifold 56. The manifold housing 48 and relief valve 60 may be configured in any shape and located anywhere within the assembly of the accumulator 10 as long as the relief valve 60 is fluidly connected to both the gas manifold 54 and the fluid manifold 56.

An auxiliary cylinder 50 is fluidly connected to the manifold housing 48 by the tubing 52. In the illustration, the auxiliary cylinder 50 is fluidly connected to the gas manifold 54 by tubing 62, thus the auxiliary cylinder 50 contains compressed gas that may be provided to the accumulator 10 as needed. In other embodiments, the auxiliary cylinder 50 may contain fluid that is fluidly connected to the fluid manifold 56 by tubing such as that shown. The auxiliary fluid may be provided to the accumulator 10 as needed.

The relief valve 60 is spring-loaded dosed to the atmosphere through a drain relief port 64 within the manifold 56 and may be opened to relieve excess pressure or to express excess gas or fluid from the accumulator 10 into the environment. Preferably, the accumulator 10 is placed within a housing 100 (FIGS. 7A and 7B) such as a cast aluminum housing to receive the expressed gas and fluid. Additionally, the housing 100 determines the overall configuration of the accumulator 10. For instance, if the housing 100 is spacious, the cylinders 12 may have an extended length to support more gas or fluid as needed, thus eliminating the need for auxiliary cylinders 50. Alternatively, any amount of cylinders 12, in any size or shape that fits within the housing 100 may be provided to increase the amount of gas or fluid as required by the accumulator 10. As such, each manifold housing 48 is independently shaped to meet the accumulator 10 requirements, while maintaining a fluid connection with the fluid ports 42 of each cylinder 12 and corresponding gas ports 40 while securing the axial closure 14 to one end of the cylinder 12. When the cylinders 12 are arranged within the housing 100, the sleeve 10 with axial closures 14, 16 addresses tensional stress only. The shell 18 of the cylinder 12, therefore may react to any stress, such as hoop stress, by swelling against the housing 100, relying on the housing 100 structure to absorb the stress, preventing the shell 18 from expanding outside the housing 100. If the shell 18 expands and is damaged, the shell 18 is easily replaceable. Additionally, and as stated above, the sleeve 20 is readily replaceable. In fact, the configuration of the novel accumulator 10 lends itself to readily replaceable parts of the assembly, including replacement of a manifold housing 48, axial closures 14, 16, and auxiliary cylinders 50. Alternatively, the configuration of the novel accumulator 10 lends itself to readily expanding or contracting the assembled accumulator 10 as need be.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An accumulator assembly comprising:

at least one accumulator cylinder, including a cylindrical, gas-impermeable shell;

a cylindrical gas-impermeable sleeve disposed within and substantially concentric with the shell, an interstitial space formed between the sleeve and the shell, the sleeve extending between opposing open ends;

a piston slidably disposed within the sleeve, the piston separating an interior of the sleeve into a first chamber configured to contain a compressed gas, and a second chamber configured to contain a pressurized fluid; and a pair of removable axial closures retained to said gas-impermeable sleeve at the opposing ends and sealingly engaged with corresponding opposing ends of said gas-impermeable shell, each said axial closure having a cylindrical stepped periphery with a larger diameter portion concentric with a smaller diameter portion, the smaller diameter portion extending into and removably secured in and directly sealingly engaged with an associated one of said ends of said gas-impermeable sleeve, and said axial closures configured to provide maximum resistance to the tensional stress of said sleeve, wherein one of the axial closures includes internal flutes, each of the flutes extending parallel to a longitudinal axis of said sleeve about the periphery of the smaller diameter portion of the axial closure allowing gas to flow between the interstitial space and said first chamber.

2. The accumulator assembly of claim 1, wherein at least one of the axial closures includes a gas port and a fluid port formed therein.

3. The accumulator assembly of claim 2, further comprising a plurality of the accumulator cylinder and a removable manifold housing including one of: a gas manifold fluidly connecting respective gas ports of said axial closures of each accumulator cylinder, and a fluid manifold fluidly connecting respective fluid ports of said axial closures of each accumulator cylinder.

4. The accumulator assembly of claim 3, said removable manifold housing further comprising a relief valve fluidly connected to said gas manifold and said fluid manifold.

5. The accumulator assembly of claim 4, further comprising at least one auxiliary cylinder containing one of said compressed gas and said pressurized fluid in communication with said removable manifold housing.

6. The accumulator assembly of claim 1, wherein at least one of said removable axial closures is retained in the associated end of said gas-impermeable sleeve by one of: threads, a bearing wedge, and a bearing roller.

7. An accumulator system comprising:

an accumulator assembly, including a plurality of accumulator cylinders, each said accumulator cylinder having a cylindrical, gas-impermeable shell, a cylindrical gas-impermeable sleeve disposed within and substantially concentric with the shell, an interstitial space formed between the sleeve and the shell, a piston slidably disposed within the sleeve, the piston separating an interior of the sleeve into a first chamber configured to contain a compressed gas, and a second chamber configured to contain a pressurized fluid, a pair of removable axial closures retained to said gas-impermeable sleeve and extending into associated opposing ends thereof and sealingly engaged with corresponding opposing ends of said gas-impermeable shell, wherein at least one of the axial closures includes a gas port and a fluid port formed therein, said sleeve extending between the associated opposing ends, the opposing ends being open, and each of the axial closures having a stepped periphery with a smaller diameter portion extending into and removably secured in and directly engaged with the corresponding opposing end of said sleeve wherein one of the axial closures includes internal flutes, each of the flutes extending parallel to a longitudinal axis of said sleeve about the periphery of the smaller diameter portion of the axial closure allowing gas to flow between the interstitial space and said first chamber; and a removable manifold housing comprising a gas manifold and a fluid manifold fluidly connecting respective fluid ports and gas ports of said axial closures of each accumulator cylinder.

8. The accumulator assembly of claim 7, wherein said axial closures are configured to provide maximum resistance to the tensional stress of said sleeve.

9. The accumulator assembly of claim 7, said removable manifold housing further comprising a relief valve fluidly connected to said gas manifold and said fluid manifold.

10. The accumulator assembly of claim 7, further comprising at least one auxiliary cylinder containing one of said compressed gas and said pressurized fluid in fluid communication with one of: the removable manifold housing, and at least one axial closure.

11. The accumulator assembly of claim 7, wherein at least one of said removable axial closures is retained in the associated end of said gas-impermeable sleeve by one of: threads, a bearing wedge, and a bearing roller.

12. An accumulator assembly comprising:

a fluidly sealed housing;

at least one accumulator cylinder within said housing, said cylinder including a cylindrical, gas-impermeable shell;

a cylindrical gas-impermeable sleeve disposed within and substantially concentric with the shell, an interstitial space formed between the sleeve and the shell, the sleeve extending between opposing open ends;

a piston slidably disposed within the sleeve, the piston separating an interior of the sleeve into a first chamber configured to contain a compressed gas, and a second chamber configured to contain a pressurized fluid;

a pair of removable axial closures retained to said gas-impermeable sleeve at the opposing ends and sealingly engaged with corresponding opposing ends of said gas-impermeable shell, each said axial closure having a cylindrical stepped periphery with a larger diameter portion concentric with a smaller diameter portion, the smaller diameter portion extending into and removably secured in and directly sealingly engaged with an associated one of said ends of said gas-impermeable sleeve, wherein at least one of the axial closures includes a gas port and a fluid port formed therein; and a removable manifold housing comprising a gas manifold and a fluid manifold fluidly connecting respective fluid ports and gas ports of said axial closures of each accumulator cylinder;

a relief valve fluidly connected to said gas manifold and said fluid manifold; and a drain relief port formed through a wall of the manifold housing configured to drain one of said fluid and gas into said housing, wherein one of the axial closures includes internal flutes, each of the flutes extending parallel to a longitudinal axis of said sleeve about the periphery of the smaller diameter portion of the axial closure allowing gas to flow between the interstitial space and said first chamber.

13. The accumulator assembly of claim 12, wherein said axial closures are configured to provide maximum resistance to the tensional stress of said sleeve.

14. The accumulator assembly of claim 12, further comprising at least one auxiliary cylinder containing one of said compressed gas and said pressurized fluid in fluid communication with one of: the removable manifold housing, and at least one axial closure.

15. The accumulator assembly of claim 12, wherein at least one of said removable axial closures is retained in the associated end of said gas-impermeable sleeve by one of: threads, a bearing wedge, and a bearing roller.

16. The accumulator assembly of claim 12, wherein said housing is configured to provide maximum resistance to axial stress and hoop stress of said shell.

* * * * *